Feb. 25, 1930.    W. N. BOOTH    1,748,631
METHOD OF FORMING VEHICLE WHEELS
Filed March 3, 1927    6 Sheets-Sheet 1
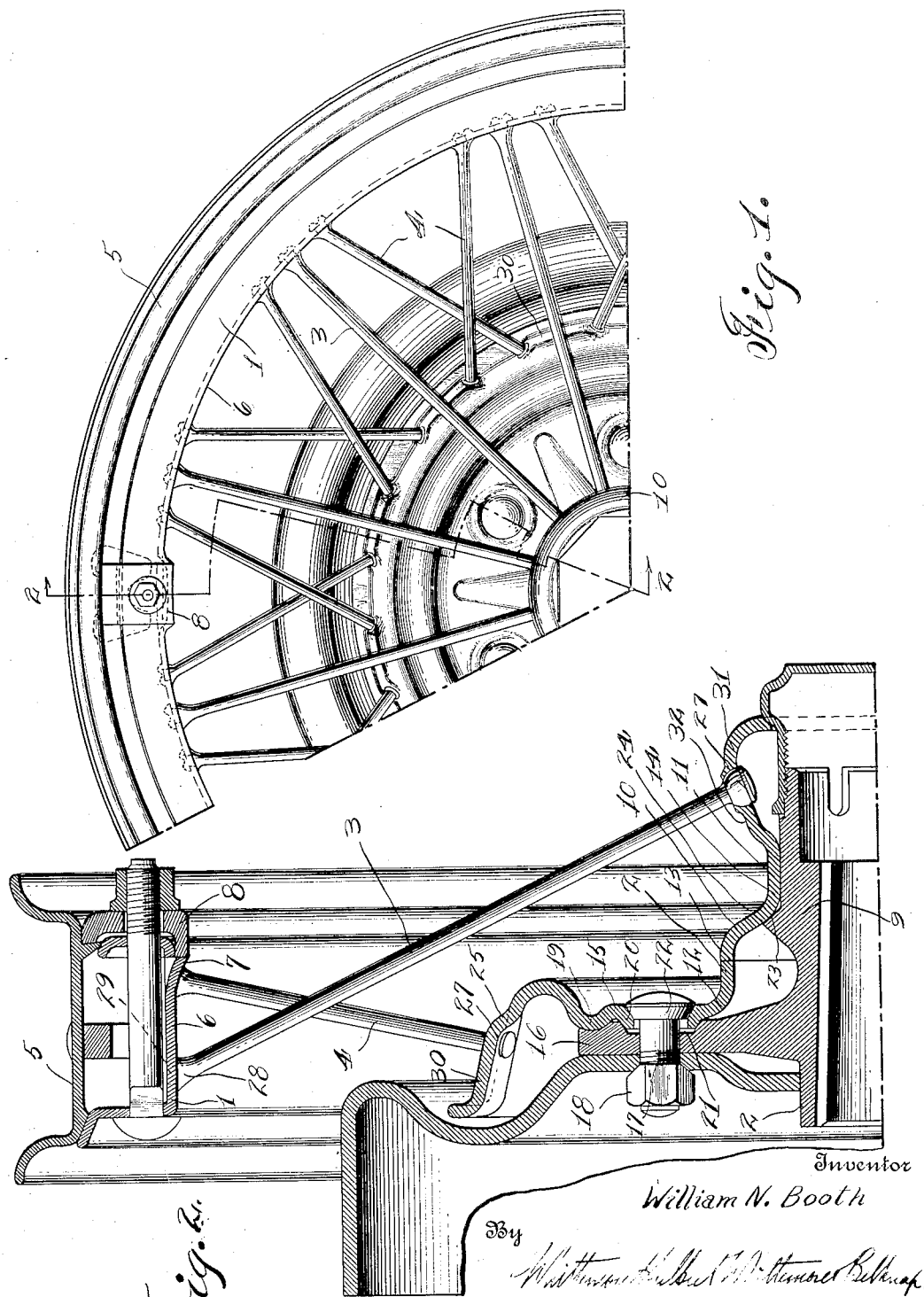
Inventor
William N. Booth
By
Attorney's

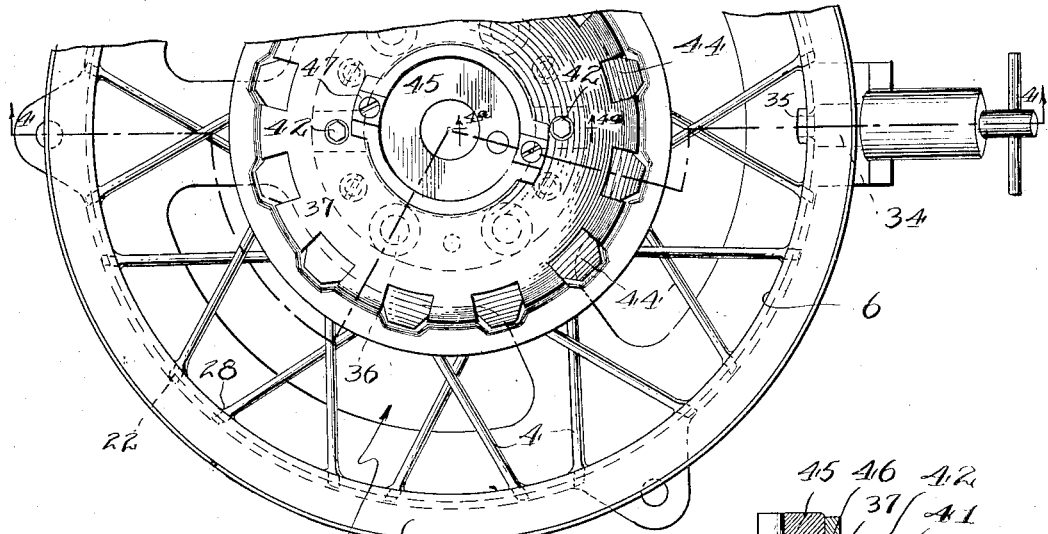
Fig. 3.
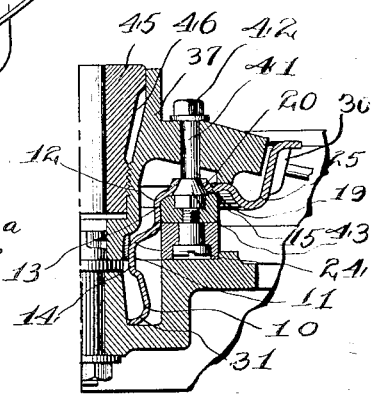
Fig. 4.ª
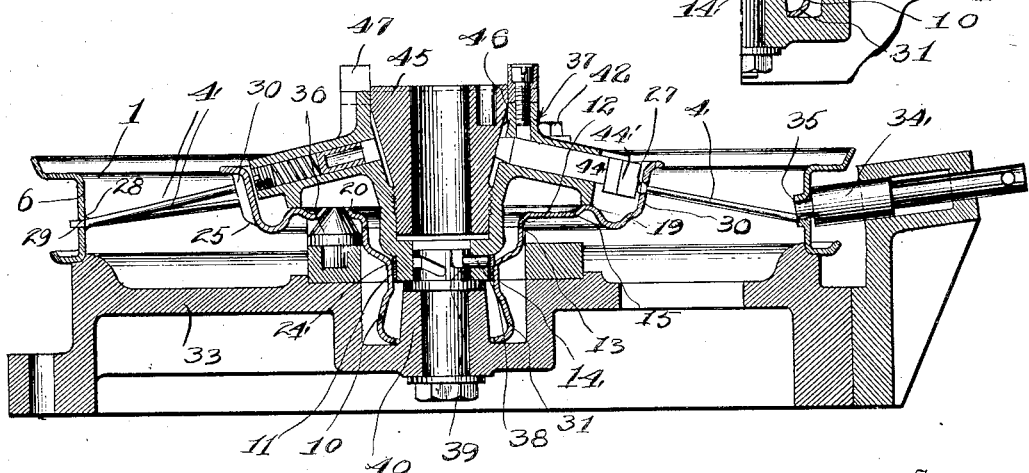
Fig. 4.

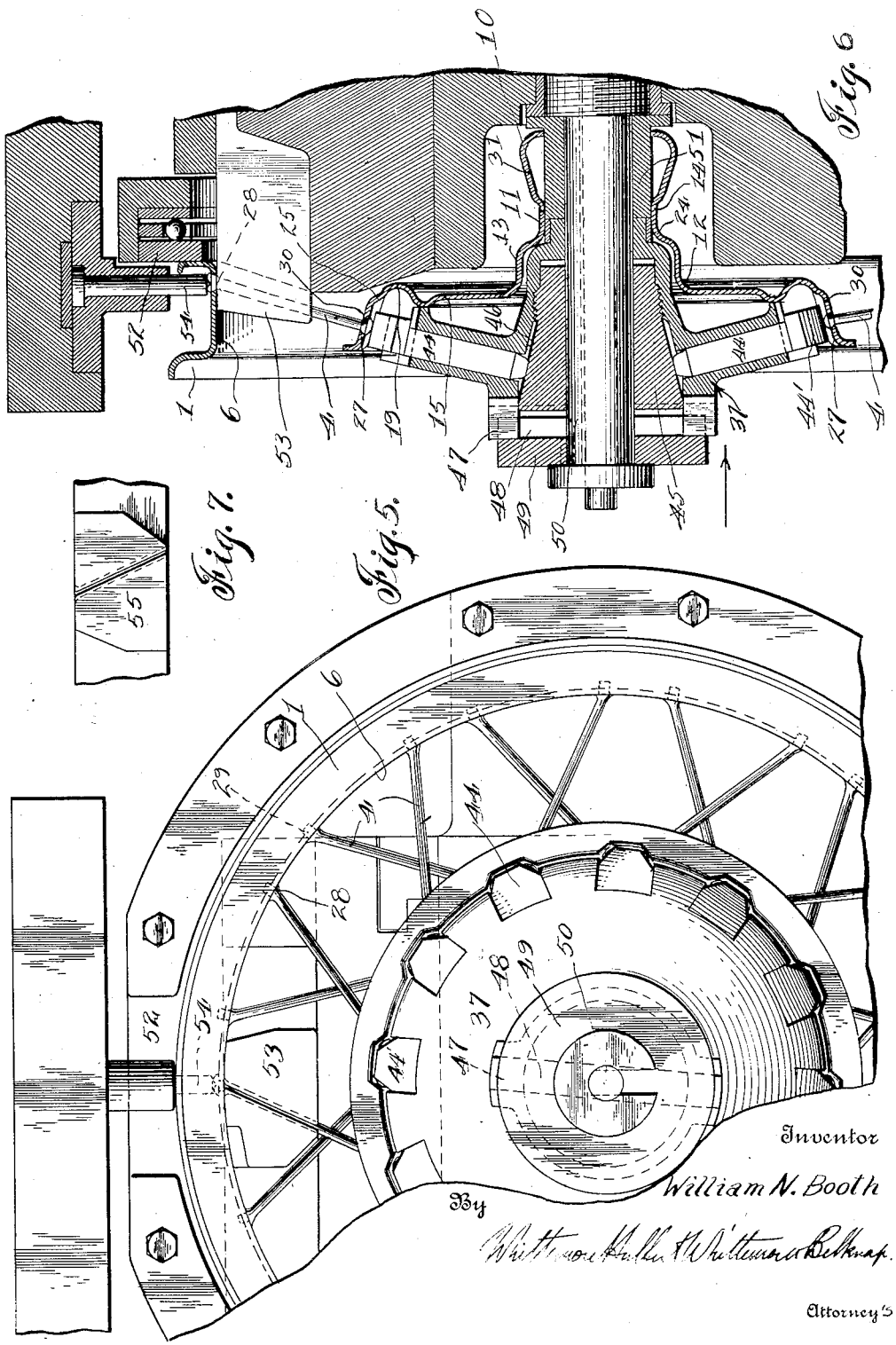

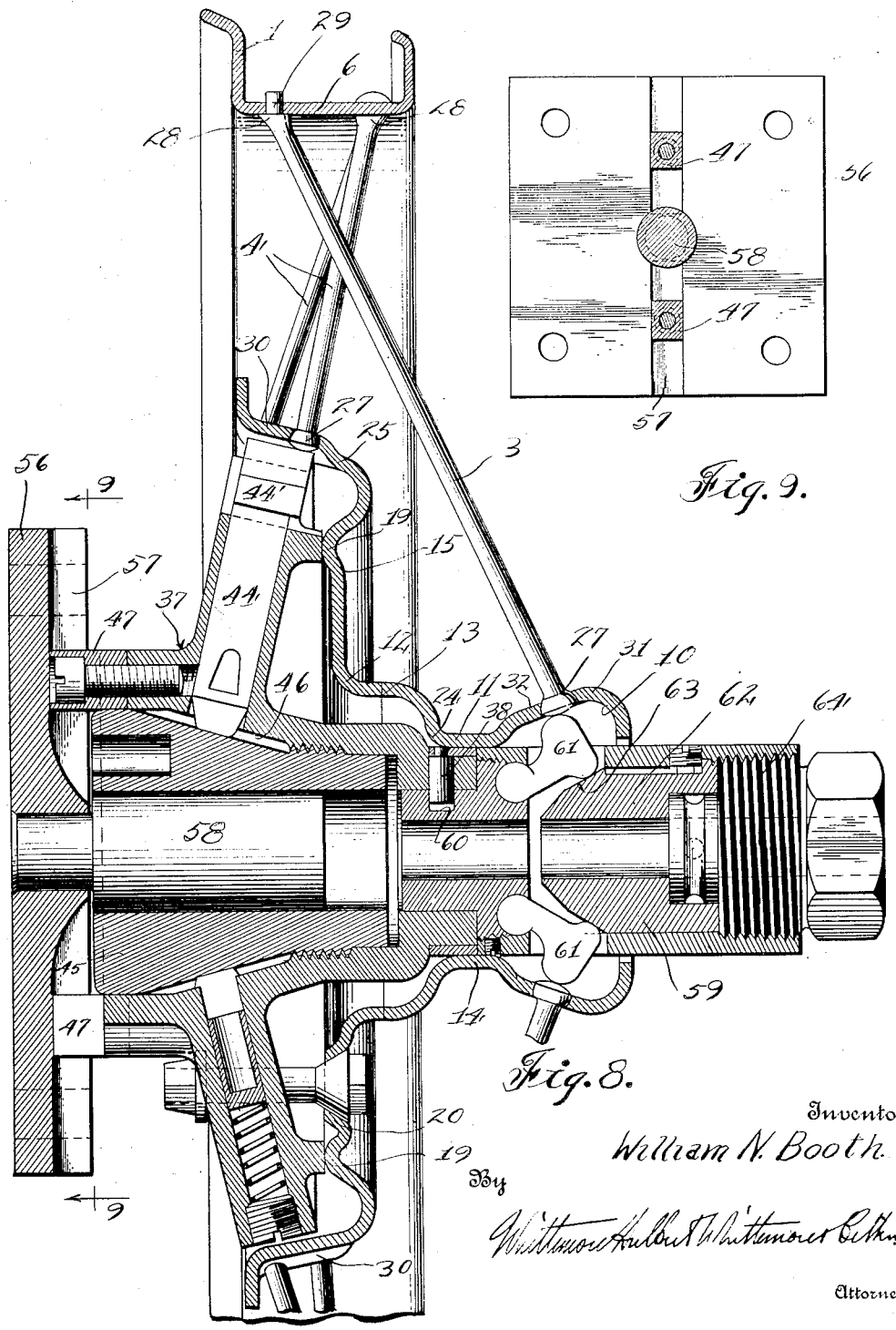

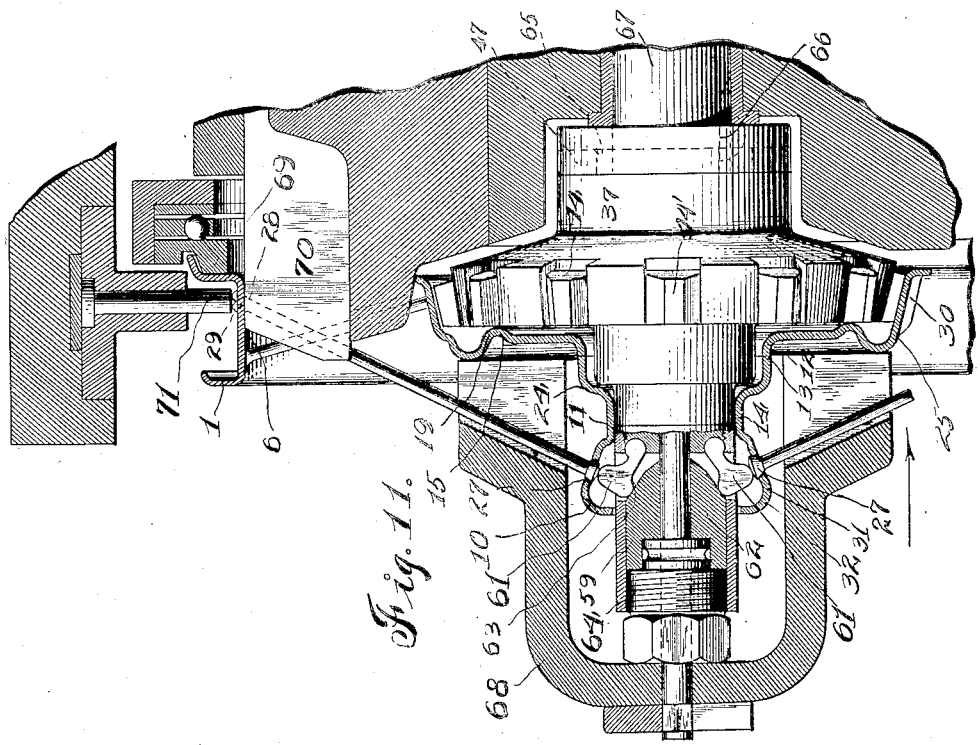

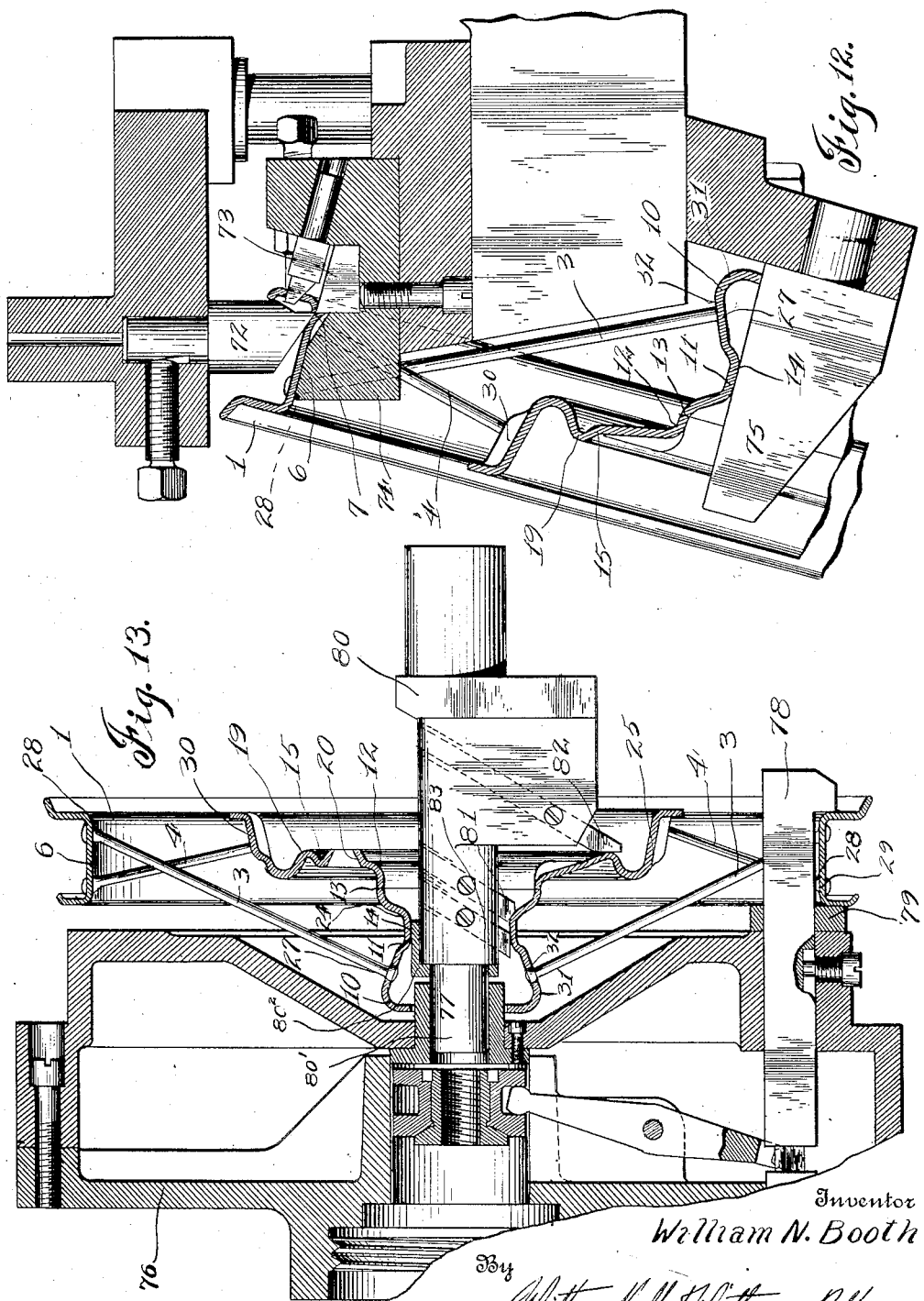

Patented Feb. 25, 1930

1,748,631

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

METHOD OF FORMING VEHICLE WHEELS

Application filed March 3, 1927. Serial No. 172,426.

The invention relates to a method of forming vehicle wheels and refers more particularly to a method of forming vehicle wire wheels of the suspension type. One of the objects of the invention is to so form a suspension wire wheel as to facilitate its assembly and assure its accuracy without the necessity of skilled workmen. Another object is to so assemble the component parts of the wheel as to assure concentrically positioning its hub and rim members by the spokes and to assure placing the spokes under tension. A further object is to assemble the component parts of the wheel while in cold condition to provide the maximum of strength and resiliency in the completed wheel. With these as well as other objects in view, the invention resides in the novel features as more fully hereinafter set forth.

In the drawings:—

Figure 1 is a front elevation of a vehicle wire wheel formed with my method;

Figure 2 is a cross section on the line 2—2 of Figure 1;

Figure 3 is a view showing the wheel during one stage of its manufacture;

Figure 4 is a cross section on the line 4—4 of Figure 3;

Figure 4ª is a cross section on the line 4ª—4ª of Figure 3;

Figure 5 is a view showing the wheel during a subsequent stage of its manufacture;

Figure 6 is a section of Figure 5;

Figure 7 is a view of a part used during this stage;

Figure 8 is a sectional view showing the wheel during a subsequent stage of its manufacture;

Figure 9 is a cross section on the line 9—9 of Figure 8;

Figure 10 is a view showing the wheel during a subsequent stage of its manufacture;

Figure 11 is a section of Figure 10;

Figure 12 is a sectional view showing the wheel during a subsequent stage of its manufacture;

Figure 13 is a sectional view showing the wheel during a subsequent stage of its manufacture.

The vehicle wheel has the rim 1, the hub 2 and the front and rear sets of spokes 3 and 4, respectively, which extend between the hub and rim for suspending the former from the latter. The rim, as shown, is a sheet metal channel-shaped felly which is provided with flared seats upon its front and rear side flanges for engagement with the demountable tire carrying rim 5. The base 6 of the felly has the inwardly depressed projections 7 near its front edge forming bearings upon which fulcrum the clamps 8 for securing the demountable rim upon the felly. The hub 2 is formed of the inner hub member 9 and the outer hub member or shell 10.

The outer hub member is formed of sheet metal preferably of greater thickness than that of the felly and for the purpose of facilitating the manufacture of this outer hub member it is made up of the front or barrel and the rear or flange forming sections 11 and 12, respectively, which are separately or individually drawn to shape and then rigidly secured to each other by means of welding their abutting ends at 13. The front section 11 has the annular depression 14 for fitting upon the inner hub member 9 while the rear section 12 has the radial flange 15 which is secured to the radial flange 16 fixed upon the inner hub member by means of the bolts 17 and the nuts 18 threaded upon these bolts. The radial flange 15 has the annular rib 19 for contacting with the front face of the radial flange 16 near its outer edge and the tapered annular flanges 20 positioned inwardly from the annular rib and having their outer faces for contacting with the tapered annular walls of the recesses 21 in the front face of the radial flange 16. The bolts have heads 22 formed with tapered annular faces for engaging the inner faces of the tapered annular flanges. The barrel of the inner hub member 9 has the annular shoulder 23 for contacting with the annular shoulder 24 upon the front section 11 of the outer hub member, the parts being so arranged relative to each other that tightening up of the nuts 18 first moves the shoulder 24 against the shoulder 23; second, flexes the radial flange 15 and brings the annular rib 19 against the radial flange 16; and third, flexes portions of the radial flange 15 and brings the tapered annular flanges 20 against the walls of the recesses 21.

The outer ends of the front and rear sets of spokes 3 and 4, respectively, are connected to the base 6 of the felly respectively at the rear and front edges thereof, while their inner ends are connected respectively to the front and rear sections 11 and 12 of the outer hub member 10 at points laterally separated a greater distance than the points of connection of the outer ends. The spokes of the rear set are inclined to the radial plane of the wheel passing through their inner ends and are commonly referred to as tangential spokes, while the spokes of the front set extend in the radial planes of the wheel and are commonly referred to as radial spokes. The spokes of the rear set are also arranged in pairs with the spokes of each pair crossing each other at points equally spaced from the radial planes passing through the spokes of the front set. Furthermore, the spokes of each pair are connected at laterally offset points to the transverse annular flange 25 at the periphery of the radial flange 15 to avoid bending these spokes.

To provide a vehicle wheel in which lateral movement of the felly relative to the hub will not buckle or bend the spokes and also to form the wheel so that it may be commercially manufactured at a relatively low cost, I have formed at the inner ends of both the front and rear sets of spokes the hemi-spherical heads 27 providing tapered annular bearing shoulders. I have also formed at the outer ends of the spokes the enlargements 28 providing shoulders at their outer ends and the tenons 29 of the same diameter as the main portions of the spokes. The tenons extend at an angle to the longitudinal axes of the spokes and the shoulders extend at right angles to the axes of the tenons so that the tenons may extend radially through the base 6 of the felly and the shoulders may properly engage the seats upon the inner face of the base. Both the heads 27 and enlargements 28 are preferably formed by an upsetting operation at fixed longitudinal distances upon the spokes. The transverse annular flange 25 upon the outer hub section 10 is provided with the peripheral bosses 30 which extend transversely of the flange and have arcuate side walls through which the spokes of the rear set extend, the spokes extending through the adjacent side walls of the adjacent bosses crossing each other and their inner ends being offset. The front end of the outer hub member 10 is formed with the annular bead 31 having the peripheral bosses 32 through which the front set of spokes extend. The openings formed in both the bosses 30 and 32 for the passage of the rear and front sets of spokes respectively are preferably countersunk from their inner sides to provide hemi-spherical seats for the shoulders upon the heads of these spokes.

In manufacture, the front and rear sets of spokes 3 and 4 are formed preferably by rolling and then drawing after which their heads and enlargements are formed by upsetting the spokes while in a cold condition with the shoulders formed by these heads and enlargements at fixed or predetermined distances apart. The felly 1 is formed preferably by rolling and its spoke engaging seats are formed while the felly is in cold condition. The outer hub member is formed by pressing while in cold condition, its spoke engaging seats also being formed while this hub member is cold and accurately positioned both peripherally and concentrically relative to the axis of the outer hub member. The felly and the outer hub member are placed upon and supported in predetermined planes by the assembling fixture 33 and peripherally positioned relative to each other as by means of the locating pin 34 upon the fixture engaging the valve stem hole 35 in the base 6 of the felly and the locating buttons 36 upon the fixture engaging the inner sides of certain of the tapered annular flanges 20 of the outer hub member. The rear set of spokes 4 may then be inserted through the openings in the bosses 30 of the outer hub member from the inside thereof, these openings being sufficiently large to permit the passage of the spoke enlargements 28 and the tenons 29 of these spokes are engaged in their correct openings in the base 6 of the felly. The rear section 37 of a spoke holding chuck is then inserted into the outer hub section with its front end foremost and this rear chuck section is secured to the fixture 33 as by means of the transverse pin 38 at the front end of the rear chuck section engaging in either of the bayonet slots 39 formed in the upper end of the pilot 40 of the fixture. This rear chuck section is rigidly secured to the outer hub member as by means of the bolts 41 and nuts 42, the bolts having heads which are adapted to rest upon and are positioned in the socket 43 of the fixture, these heads having tapered annular faces for engaging the inner faces of the tapered annular flanges 20 not engaged by the locating buttons 36. The plungers 44 of the rear chuck section are then forced outwardly into engagement with the heads 27 of the rear set of spokes as by means of the screw 45 having an annular tapered face 46 engageable with the inner ends of these plungers. Each plunger preferably has a head 44' at its outer end which is adapted to move into a boss 30 and to engage the heads of the spokes extending through the arcuate side walls of this boss. The plungers are forced outwardly to force the shoulders upon the heads of the spokes into firm engagement with the seats of the bosses 30 with a force sufficient to distort and stress the metal forming these bosses but within its elastic limit. The apparatus used in assembling the wheel as thus far described, as well as the wheel as thus far assembled, is shown in Figures 3 and 4.

The partially assembled wheel with the rear chuck section still secured to the outer hub member is then positioned in a suitable apparatus, shown in Figures 5, 6 and 7, with the wheel peripherally positioned in this apparatus as by means of the locating projections 47 upon the rear end of the rear chuck section engaging in a diametrically extending groove 48 formed in the collar 49, this collar being non-rotatably mounted upon the shaft 50 which extends through the rear chuck section. The rear chuck section is then axially moved in the direction indicated by the arrow in Figure 6 until its front end contacts with the abutment 51, during which time the felly is held from corresponding axial movement by means of the abutment 52 so that the shoulders formed by the enlargements 28 are brought into firm engagement with the seats upon the base 6 of the felly. The felly during this operation is free to move radially so that the shoulders of the spokes position the felly concentrically relative to the outer hub member. The spokes extending tangentially in corresponding directions are then in the present instance successively operated upon by the dies or gripping jaws 53 and the punch 54, the dies or gripping jaws being arranged to engage the spoke enlargements as well as adjacent portions of the spokes and tightly grip the same prior to and during the operation of the punch, which rivets over the outer ends of the tenons of the spokes against the outer face of the felly base 6, thereby preventing buckling. Other dies or gripping jaws 55 may then be inserted in the apparatus after which the spokes extending tangentially in the opposite direction are operated upon to rivet over the outer ends of their tenons against the outer face of the base of the felly during which these dies or gripping jaws function to hold the spokes from buckling. With this method the felly and outer hub members are in a relative position which relieves the spokes from tension while being secured. Furthermore the outer hub member and particularly its bosses engaged by the spokes is distorted at the same time to provide for later tensioning the spokes.

After the rear set of spokes 4 have been secured the partially assembled wheel with the rear chuck section is positioned in a suitable fixture 56, shown in Figures 8 and 9, with the locating projections 47 engaging in the aligned radial grooves 57 to hold the rear chuck section from rotation. This fixture has the pilot 58 over which the rear chuck section extends at this time. The front set of spokes 3 may then be inserted through the openings in the bosses 32 of the outer hub member from the inside thereof, these openings being sufficiently large to permit the passage of the spoke enlargements 28 and the tenons 29 of these spokes are engaged in their correct openings in the felly base 6. The front section 59 of the spoke holding chuck is then secured to the rear chuck section by means of the transverse pin 38 which engages in the bayonet slot 60 formed in the rear end of the front chuck section. The heads 27 of the front spokes are then forced outwardly by means of the rock arms 61 engaging these heads and actuated by the plug 62 having a tapered face 63 engageable with the rock arms. The plug 62 is forced rearwardly by means of the screw 64. The pressure exerted upon the heads of the front spokes is sufficient to force their shoulders into firm engagement with the seats upon the bosses 32 and to distort and stress the metal forming these bosses within its elastic limit.

The partially assembled wheel with both the front and rear chuck sections is then positioned in an apparatus shown in Figures 10 and 11 and broadly similar to that shown in Figures 5, 6 and 7. The wheel is peripherally positioned by engaging the locating projections 47 upon the rear chuck section in aligned radial grooves 65 formed in the collar 66 which is secured to the shaft 67. The outer hub member with the complete spoke holding chuck is then forced in the direction indicated by the arrow in Figure 11, as by means of the cup-shaped collar 68 at the front end of the outer hub member and having its flange engaging the radial flange of this outer hub member adjacent to its annular rib. This axial movement of the outer hub member and complete spoke holding chuck continues until the spoke holding chuck contacts with the collar 65 during which time the felly is held from axial movement in a corresponding direction by contact with the abutment 69. At this time the metal in the felly and particularly its base 6, as well as the metal in the outer hub member and particularly its bosses 30, is distorted within its elastic limit and the shoulders formed by the enlargements 28 upon the front spokes are brought into firm engagement with the seats upon the felly base. These front spokes are then operated upon (successively in the present instance) by the dies or gripping jaws 70 and the punch 71, the dies 70 functioning in the same manner as those previously described to hold the spokes from buckling during the riveting over of the outer ends of the front spoke tenons against the outer face of the felly base. During this riveting operation the front spokes are also relieved from tension.

With the above method it is to be noted that the assembling of the parts is effected while they are in cold condition so that they have the maximum of strength and resiliency in the completed wheel.

After this operation the spoke holding chuck may be removed from the wheel and the distortion of the felly and outer hub member relieved, at which time equal tension will be placed upon all of the spokes owing to the resiliency of the metal in the felly and outer hub member.

The depressed projections 7 in the felly base 6 are then preferably formed in a suitable apparatus while the felly is in cold condition, shown in Figure 12, as by means of the punch 72 and cooperating die 73 and die holder 74, the outer hub member at this time being normally supported by the supporting pin 75.

To make sure that the rear face of the annular rib 19 and the shoulder 24 are properly spaced a predetermined distance apart and at the same time to make sure that their planes are parallel to the plane of rotation of the wheel, and further to make sure that the inner face of the annular depression 14 is at right angles to the plane of rotation of the wheel, I mount the wheel in the apparatus 76, shown in Figure 13, which is provided with properly located cutters to remove any metal, if necessary. In detail this apparatus has the bushing 77 adapted to extend into the front end of the outer hub member and the clamps 78 for securing the felly against the abutment 79. 80 is the tool holder which is adapted to be rotated. This tool holder has at its front end the reduced pilot 80' engageable in the bushing 77 and the enlarged pilot $80^2$ for engaging the inner face of the depressed portion 14 to properly center the wheel in the apparatus. After the centering of the wheel, the clamps 78 are actuated to clamp the felly against the abutment 79. The tool holder carries the cutter 81 which is adapted to true up the shoulder 24, the cutter 82 which is adapted to true up the rear face of the annular rib 19 and the cutter 83 which is adapted to true up the inner face of the annular depression 14, these cutters being so arranged upon the tool holder that they are engageable with the work after the wheel has been centered and secured in place. By reason of this step it will be seen that the essential bearing faces of the outer hub member engageable with the inner hub member are accurately formed so that when the wheel is placed upon the inner hub member and rotated the rotation will be true.

The wheel body comprising the felly, the outer hub member or shell and the front and rear sets of spokes under tension may then be assembled upon the inner hub member and secured thereto by means of the securing bolts and nuts, during which time the radial flange of the outer hub member is flexed to additionally tension the spokes.

What I claim as my invention is:

1. The method of forming a suspension vehicle wheel having hub and rim members with spoke engaging seats and spokes with preformed shoulders at fixed longitudinal distances for engaging the seats, which includes distorting one of the members within its elastic limit to diminish the distances between the cooperating seats, engaging the spokes with the members when one is distorted, securing the spokes to one of the members with the shoulders in contact with the seats and when one of the members is distorted and then relieving the distortion to tension the spokes.

2. The method of forming a suspension vehicle wheel having hub and rim members with a plurality of sets of spoke engaging seats and a plurality of sets of spokes with preformed shoulders at fixed longitudinal distances for engaging their corresponding seats, which includes engaging one set of spokes with the members and securing this set to one of the members with the shoulders engaging their corresponding seats while in relative positions which relieve this set from tension, in engaging another set of spokes with the members and securing the last mentioned set to one of the members with the shoulders engaging their corresponding seats while in relative positions which relieve the last mentioned set from tension and then allowing the seats to relatively move to tension both sets.

3. The method of forming a vehicle wheel having a plurality of sets of spokes with shoulders at fixed longitudinal distances and facing in the same direction for engaging the hub and rim members, which includes engaging one set of the spokes with the hub and rim members, relatively moving the hub and rim members to a permanent position relative to and determined by the shoulders of the set of spokes, forming opposed shoulders upon and integral with the set of spokes while the hub and rim members are thus positioned, engaging another set of spokes with the hub and rim members, distorting one of the hub and rim members, relatively moving the hub and rim members to a permanent position relative to and determined by the shoulders of the last mentioned set of spokes and forming shoulders upon and integral with the last mentioned set of spokes while the hub and rim members are thus positioned, and relieving the distortion to place both sets of spokes under tension.

4. The method of forming a vehicle wheel having spokes with shoulders at fixed longitudinal distances for engaging the hub and rim members, which includes engaging the spokes with the hub and rim members, forcing one of the shoulders of each of the spokes firmly against one of the members and distorting the latter, relatively moving the members to bring the other into firm engagement with the other shoulder of each of the spokes, forming an opposed shoulder upon and integral with each of the spokes while the members are thus positioned, relieving the distortion and allowing the members to move to their normal positions to tension the spokes.

5. The method of forming a vehicle wheel, which consists in forming spoke engaging seats upon the hub and rim members, in forming spokes with shoulders at fixed distances from each other for engaging the seats, in assembling the spokes with the hub and rim members while the seats are in relative positions which relieve the spokes from tension, in relatively moving the seats to place the spokes under tension, and in machining the bearing portions of the hub member to accurately position the same relative to each other.

6. The method of manufacturing a suspension wire wheel, which consists in forming spoke engaging seats upon the hub and rim members, in forming a plurality of sets of spokes with shoulders at fixed distances from each other for engaging the seats, in assembling and connecting one set of spokes with the hub and rim members with the shoulders of this set engaging their corresponding seats while these seats are in relative positions which relieve this set from tension, in relatively moving the seats, in assembling and connecting another set of spokes with the hub and rim members with the shoulders of the last mentioned set engaging their corresponding seats while these seats are in relative positions, which relieve the last mentioned set from tension, and in then allowing the seats to move relatively to place the sets under tension.

7. The method of manufacturing a suspension wire wheel, which consists in forming spoke engaging seats upon the hub and rim members, in forming a plurality of sets of spokes with shoulders at fixed distances from each other for engaging the seats, in assembling and connecting one set of spokes with the hub and rim members with the shoulders of this set engaging their corresponding seats while the hub and rim members are in a relative position, which relieves this set from tension, in relatively moving the hub and rim members, in assembling and connecting another set of spokes with the hub and rim members with the shoulders of the last mentioned set engaging their corresponding seats while the hub and rim members are in a relative position, which relieves the last mentioned set from tension, and in then allowing the hub and rim members to relatively move to place the sets under tension.

8. The method of forming a suspension vehicle wheel, which consists in forming spokes with shoulders at their inner ends, assembling the spokes with a hub member and a rim member, exerting an outward pressure upon the shoulders of all of the spokes and the adjacent portions of the hub member to hold the shoulders against the hub member and to distort the adjacent portions of the hub member within their limits of elasticity, locating the rim member concentrically relative to the hub member, connecting the spokes at their outer ends to the rim member while the shoulders are clamped against the hub member and the portions of the hub member adjacent the shoulders are distorted, and subsequently relieving the shoulders and the adjacent portions of the hub member from outward pressure.

9. The method of forming a suspension vehicle wheel, which consists in forming a set of spokes with inner and outer shoulders at predetermined distances from each other, assembling the spokes with the hub and rim members, exerting an outward pressure upon the inner shoulders and the adjacent portions of the hub member to clamp the inner shoulders against the hub member and to distort the adjacent portions within their limits of elasticity, locating the rim members in contact with the outer shoulders to concentrically position the rim member relative to the hub member, riveting over the outer ends of the spokes to rigidly clamp the rim member against the outer shoulders, and subsequently relieving the inner shoulders and the adjacent portions of the hub member from outward pressure.

10. The method of forming a suspension vehicle wheel, which consists in forming front and rear sets of spokes with shoulders at their inner ends, assembling the front and rear sets of spokes with a hub member and a rim member, inserting a chuck into the hub member, operating the chuck to clamp the shoulders of the front and rear sets of spokes against the inner face of the hub member, locating the rim member concentrically relative to the hub member, and connecting the front and rear sets of spokes at their outer ends to the rim member while their shoulders are clamped against the hub member and the hub and rim members are concentrically positioned.

11. The method of forming a suspension vehicle wheel, which consists in forming a plurality of sets of spokes with shoulders at their inner ends, assembling one set of spokes with a hub member and a rim member, inserting a chuck section into the hub member, operating the chuck section to clamp the shoulders of the assembled set of spokes against the inner face of the hub member, locating the rim member concentrically relative to the hub member, connecting the assembled spokes at their outer ends to the rim member while the shoulders are clamped against the hub member and the hub and rim members are concentrically positioned, assembling another set of spokes with the hub and rim members, inserting another chuck section into the hub member, operating the last-mentioned chuck section to clamp the shoulders of the last-mentioned assembled set of spokes against the inner face of the hub member, connecting the last-mentioned assembled set of spokes at their outer ends to the rim member while their shoulders are clamped against the hub member, and removing the chuck sections.

12. The method of forming a suspension vehicle wheel, which consists in forming spoke engaging seats upon a rim member and upon the barrel and flange portions of a flexible hub member, connecting spokes to the hub and rim members in engagement with the seats and flexing the flange portion of the hub member axially to effect tensioning of the spokes.

13. The method of forming a suspension vehicle wheel, which consists in forming spoke engaging seats upon a rim member and upon the barrel and flange portions of a flexible outer hub member, connecting spokes to the hub and rim members in engagement with the seats, mounting the assembled hub member, rim member, and spokes upon an inner hub member, and securing the two hub members to each other and at the same time flexing the flange portion of the outer hub member axially to effect tensioning of the spokes.

14. The method of forming a suspension vehicle wheel, which consists in die-forming from sheet metal a hub shell having barrel and flange portions with the flange portion provided with a bearing portion, forming a rim member, securing spokes to the hub and rim members with the members engaging the spokes at predetermined points, chucking the rim member using a face thereof for positioning the same, and truing up the bearing portion while the rim member is thus chucked.

15. The method of forming a suspension vehicle wheel, which consists in die-forming from sheet metal a hub shell having barrel and flange portions with the latter provided with a bearing portion, forming a rim member, forming spokes with shoulders at fixed distances from each other, assembling the spokes with the hub and rim members to engage the shoulders with the members to thereby concentrically locate the members relative to each other, securing the spokes rigidly to one of the members, chucking the rim member using a face thereof for positioning the same, and truing up the bearing portion while the rim member is thus chucked.

16. The method of forming a suspension wire wheel, which comprises providing hub and rim members with annular shoulder engaging portions, providing spokes with load carrying and positioning shoulders facing in the same direction and at fixed distances from each other for engaging the annular shoulder engaging portions, assembling the spokes with the hub and rim members by a movement of the spokes in one direction to engage the shoulders with the annular shoulder engaging portions and thereby concentrically locate the hub and rim members, forming shoulders upon the spokes opposed to the positioning shoulders and abutting the one of the hub and rim members with which the positioning shoulders are engaged to maintain such engagement and to carry the load, relatively moving the shoulder engaging portions of the hub and rim members to place the spokes under tension and holding the same in a relative position where the spokes are maintained under tension.

17. The method of forming a suspension wire wheel, which comprises providing spokes with inner and outer shoulders facing in the same direction and at fixed distances apart, providing hub and rim members with annular shoulder engaging portions, passing the spokes outwardly through the hub member, holding the inner and outer shoulders firmly against the shoulder engaging portions of the hub and rim members respectively to concentrically position the hub and rim members, forming shoulders upon the spokes opposed to the outer shoulders and abutting the rim member, relatively moving the shoulder engaging portions of the hub and rim members to tension the spokes and holding the same in relative position where the spokes are maintained under tension.

18. The method of forming a suspension wire wheel, which consists in providing hub and rim members with shoulder engaging portions, providing a plurality of sets of spokes with load carrying and positioning shoulders at fixed distances from each other for engaging the shoulder engaging portions, assembling and connecting one set of spokes with the hub and rim members with the shoulders of this set engaging their corresponding shoulder engaging portions, applying pressure to relatively move the spoke engaging portions, assembling and connecting another set of spokes with the hub and rim members with the shoulders of the last mentioned set engaging their corresponding shoulder engaging portions, and in releasing the pressure.

19. The method of forming a suspension wire wheel, which consists in providing hub and rim members with shoulder engaging portions, providing spokes with shoulders facing in the same direction and at fixed longitudinal distances apart for engaging the shoulder engaging portions, assembling the spokes with the hub and rim members, distorting one of the hub and rim members within its elastic limit to diminish the distances between the cooperating shoulder engaging portions, engaging the shoulders with the shoulder engaging portions when the one of the hub and rim members is distorted to concentrically locate the hub and rim members relative to each other, securing the spokes to one of the hub and rim members with the shoulders in engagement with the shoulder engaging portions to maintain such engagement and to carry the load, and then relieving the distortion.

20. The method of forming a suspension wire wheel, which consists in providing spokes with load carrying and positioning shoulders facing in the same direction and at fixed longitudinal distances apart, providing hub and rim members with shoulder engaging portions, engaging the spokes with the hub and rim members, forcing the load carrying shoulders of the spokes firmly against the shoulder engaging portions of one of the members and distorting the latter, relatively moving the hub and rim members to bring the shoulder engaging portions of the other of the hub and rim members into firm engagement with the positioning shoulders to thereby concentrically position the hub and rim members relative to each other, securing the spokes to the other of the members with the positioning shoulders in engagement therewith, and relieving the distortion.

21. The method of forming a suspension wire wheel, which consists in providing shoulder engaging portions upon the hub and rim members, providing spokes with enlargements forming load carrying and positioning shoulders at fixed distances from each other and facing in the same direction for engaging the shoulder engaging portions, assembling the spokes with the hub and rim members to engage the shoulders with the shoulder engaging portions and thereby concentrically locate the hub and rim members, securing the spokes to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

22. The method of forming a suspension wire wheel, which consists in providing annular shoulder engaging portions upon the hub and rim members, providing spokes with enlargements near their ends providing load carrying and positioning shoulders facing in the same direction and at fixed distances from each other for engaging the annular shoulder engaging portions and with tenons extending from the load positioning shoulders and having substantially the same cross sectional areas as the main portions of the spokes, assembling the spokes with the hub and rim members to engage the shoulders with the annular shoulder engaging portions and thereby concentrically locate the hub and rim members, securing the tenons to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

23. The method of forming a suspension wire wheel, which comprises providing hub and rim members with shoulder engaging portions, providing spokes with load carrying and positioning shoulders at fixed distances from each other for engaging the shoulder engaging portions, assembling the spokes with the hub and rim members, engaging the shoulders with the shoulder engaging portions while the hub and rim members are in a relative position to relieve the spokes from tension and thereby concentrically locating the hub and rim members, securing the spokes to the one of the hub and rim members with which the positioning shoulders are engaged while maintaining the fixed distances between the load carrying and positioning shoulders, relatively moving the shoulder engaging portions of the hub and rim members to tension the spokes and holding the same in a relative position where the spokes are maintained under tension.

24. The method of forming a suspension wire wheel which consists in providing hub and rim members arranged with seats to receive a plurality of spokes, and a plurality of spokes arranged with preformed shoulders at a predetermined distance apart at opposite ends thereof, positioning the hub and rim members in concentric relation by the engagement of the spoke shoulders with the seats of the hub and rim members, maintaining the concentric relation of the hub and rim members by securing the ends of the spokes adjacent one of their shoulders to one of the members without modifying the predetermined distance between the shoulders, thereafter tensioning the spokes by a relative movement of the seats of the hub and rim members, and maintaining the spokes under tension.

25. The method of forming a suspension wire wheel which consists in providing hub and rim members arranged with annular seats to receive a plurality of spokes, and a plurality of spokes arranged with preformed annular shoulders at a predetermined distance apart at opposite ends thereof, positioning the hub and rim members in concentric relation by the engagement of the spoke shoulders with the annular seats of the hub and rim members, maintaining the concentric relation of the hub and rim members by securing the ends of the spokes adjacent one of their shoulders to one of the members without modifying the predetermined distance between the shoulders while the spokes are relieved from tension, thereafter tensioning the spokes by a relative movement of the seats of the hub and rim members, and maintaining the spokes under tension.

26. The method of forming a suspension wire wheel, which comprises providing hub and rim members with annular shoulder engaging portions, providing spokes with load carrying and positioning shoulders facing in the same direction and at fixed distances from each other for engaging the annular shoulder engaging portions, assembling the spokes with the hub and rim members by a movement of the spokes in one direction, engaging the shoulders with the annular shoulder engaging portions while the hub and rim members are in a relative position to relieve the spokes from tension, and thereby concentrically locating the hub and rim members, securing the spokes while relieved from tension to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

27. The method of forming a suspension wire wheel, which comprises providing hub and rim members with shoulder engaging portions, providing spokes with load carrying and positioning shoulders at fixed distances from each other for engaging the shoulder engaging portions, assembling the spokes with the hub and rim members, engaging the shoulders with the shoulder engaging portions while the hub and rim members are in a relative position to relieve the spokes from tension and thereby concentrically locating the hub and rim members, forming shoulders upon the spokes opposed to the positioning shoulders and abutting the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

28. The method of forming a suspension wire wheel which consists in providing hub and rim members with shoulder receiving portions, providing a plurality of sets of spokes with shoulders, assembling one set of spokes with the spoke shoulders engaging the shoulder receiving portions of one of the members, holding the spoke shoulders at predetermined distances from the shoulder receiving portions of the other of the members, connecting the spokes to the last-named member, moving the shoulder receiving portions of the members relatively to tension the assembled set of spokes, assembling a second set of spokes with the spoke shoulders engaging the shoulder receiving portions of one of the members, holding the spoke shoulders at predetermined distances from the shoulder receiving portions of the other of the members, connecting the spokes to the last-named member, and relieving the tension upon the first-named set of spokes to uniformly tension all of the spokes.

29. The method of forming a suspension vehicle wheel which consists in providing spokes with shoulders at their inner ends, assembling the spokes with a hub member and a rim member, forcing the shoulders of the spokes against the inner face of the hub member by pressure applied within the hub member, locating the rim member concentrically relative to the hub member and connecting the spokes at their outer ends to the rim member while their shoulders are held against the hub member and the hub and rim members are concentrically positioned.

30. The method of tensioning a suspension vehicle wheel comprising a rim member, a hub member, and series of spokes connecting said members, which consists in effecting a flexing of the hub member axially to relatively move its connected series of spokes.

31. The method of tensioning a suspension vehicle wheel comprising a rim member, a hub member, and series of spokes connecting said members, which consists in flexing the hub member axially to separate its connected series of spokes.

32. The method of tensioning a suspension vehicle wheel having a rim member with spoke engaging seats, a hub member with axially separated series of spoke engaging seats, spokes engaging the seats of the hub and rim members and connecting said members which consists in flexing the hub member to axially separate its series of spoke engaging seats.

33. The method of tensioning a suspension vehicle wheel comprising a rim member, a hub member, and series of spokes connecting said members and constituting therewith an assembled unit which consists in mounting the unit upon an inner hub member, and at the same time flexing the first-mentioned hub member axially to relatively move its connected series of spokes.

34. The method of forming a suspension vehicle wheel comprising a hub member, a rim member, and a series of spokes connecting said members, which consists in distorting the hub member within its elastic limit, securing the spokes to the hub and rim members while the hub member is under distortion, relieving the distortion of the hub member to tension the spokes, and thereafter relatively moving the hub and rim members to increase the tension of the spokes.

35. The method of forming a suspension engaging portions to maintain such engagement and to carry the load, and then relieving the distortion.

20. The method of forming a suspension wire wheel, which consists in providing spokes with load carrying and positioning shoulders facing in the same direction and at fixed longitudinal distances apart, providing hub and rim members with shoulder engaging portions, engaging the spokes with the hub and rim members, forcing the load carrying shoulders of the spokes firmly against the shoulder engaging portions of one of the members and distorting the latter, relatively moving the hub and rim members to bring the shoulder engaging portions of the other of the hub and rim members into firm engagement with the positioning shoulders to thereby concentrically position the hub and rim members relative to each other, securing the spokes to the other of the members with the positioning shoulders in engagement therewith, and relieving the distortion.

21. The method of forming a suspension wire wheel, which consists in providing shoulder engaging portions upon the hub and rim members, providing spokes with enlargements forming load carrying and positioning shoulders at fixed distances from each other and facing in the same direction for engaging the shoulder engaging portions, assembling the spokes with the hub and rim members to engage the shoulders with the shoulder engaging portions and thereby concentrically locate the hub and rim members, securing the spokes to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

22. The method of forming a suspension wire wheel, which consists in providing annular shoulder engaging portions upon the hub and rim members, providing spokes with enlargements near their ends providing load carrying and positioning shoulders facing in the same direction and at fixed distances from each other for engaging the annular shoulder engaging portions and with tenons extending from the load positioning shoulders and having substantially the same cross sectional areas as the main portions of the spokes, assembling the spokes with the hub and rim members to engage the shoulders with the annular shoulder engaging portions and thereby concentrically locate the hub and rim members, securing the tenons to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

23. The method of forming a suspension wire wheel, which comprises providing hub and rim members with shoulder engaging portions, providing spokes with load carrying and positioning shoulders at fixed distances from each other for engaging the shoulder engaging portions, assembling the spokes with the hub and rim members, engaging the shoulders with the shoulder engaging portions while the hub and rim members are in a relative position to relieve the spokes from tension and thereby concentrically locating the hub and rim members, securing the spokes to the one of the hub and rim members with which the positioning shoulders are engaged while maintaining the fixed distances between the load carrying and positioning shoulders, relatively moving the shoulder engaging portions of the hub and rim members to tension the spokes and holding the same in a relative position where the spokes are maintained under tension.

24. The method of forming a suspension wire wheel which consists in providing hub and rim members arranged with seats to receive a plurality of spokes, and a plurality of spokes arranged with preformed shoulders at a predetermined distance apart at opposite ends thereof, positioning the hub and rim members in concentric relation by the engagement of the spoke shoulders with the seats of the hub and rim members, maintaining the concentric relation of the hub and rim members by securing the ends of the spokes adjacent one of their shoulders to one of the members without modifying the predetermined distance between the shoulders, thereafter tensioning the spokes by a relative movement of the seats of the hub and rim members, and maintaining the spokes under tension.

25. The method of forming a suspension wire wheel which consists in providing hub and rim members arranged with annular seats to receive a plurality of spokes, and a plurality of spokes arranged with preformed annular shoulders at a predetermined distance apart at opposite ends thereof, positioning the hub and rim members in concentric relation by the engagement of the spoke shoulders with the annular seats of the hub and rim members, maintaining the concentric relation of the hub and rim members by securing the ends of the spokes adjacent one of their shoulders to one of the members without modifying the predetermined distance between the shoulders while the spokes are relieved from tension, thereafter tensioning the spokes by a relative movement of the seats of the hub and rim members, and maintaining the spokes under tension.

26. The method of forming a suspension wire wheel, which comprises providing hub and rim members with annular shoulder engaging portions, providing spokes with load carrying and positioning shoulders facing in the same direction and at fixed distances from each other for engaging the annular shoulder engaging portions, assembling the spokes with the hub and rim members by a movement of the spokes in one direction, engaging the shoulders with the annular shoulder engaging portions while the hub and rim members are in a relative position to relieve the spokes from tension, and thereby concentrically locating the hub and rim members, securing the spokes while relieved from tension to the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

27. The method of forming a suspension wire wheel, which comprises providing hub and rim members with shoulder engaging portions, providing spokes with load carrying and positioning shoulders at fixed distances from each other for engaging the shoulder engaging portions, assembling the spokes with the hub and rim members, engaging the shoulders with the shoulder engaging portions while the hub and rim members are in a relative position to relieve the spokes from tension and thereby concentrically locating the hub and rim members, forming shoulders upon the spokes opposed to the positioning shoulders and abutting the one of the hub and rim members with which the positioning shoulders are engaged to maintain such engagement and to carry the load, relatively moving the shoulder engaging portions of the hub and rim members to tension the spokes and holding the same in a relative position where the spokes are maintained under tension.

28. The method of forming a suspension wire wheel which consists in providing hub and rim members with shoulder receiving portions, providing a plurality of sets of spokes with shoulders, assembling one set of spokes with the spoke shoulders engaging the shoulder receiving portions of one of the members, holding the spoke shoulders at predetermined distances from the shoulder receiving portions of the other of the members, connecting the spokes to the last-named member, moving the shoulder receiving portions of the members relatively to tension the assembled set of spokes, assembling a second set of spokes with the spoke shoulders engaging the shoulder receiving portions of one of the members, holding the spoke shoulders at predetermined distances from the shoulder receiving portions of the other of the members, connecting the spokes to the last-named member, and relieving the tension upon the first-named set of spokes to uniformly tension all of the spokes.

29. The method of forming a suspension vehicle wheel which consists in providing spokes with shoulders at their inner ends, assembling the spokes with a hub member and a rim member, forcing the shoulders of the spokes against the inner face of the hub member by pressure applied within the hub member, locating the rim member concentrically relative to the hub member and connecting the spokes at their outer ends to the rim member while their shoulders are held against the hub member and the hub and rim members are concentrically positioned.

30. The method of tensioning a suspension vehicle wheel comprising a rim member, a hub member, and series of spokes connecting said members, which consists in effecting a flexing of the hub member axially to relatively move its connected series of spokes.

31. The method of tensioning a suspension vehicle wheel comprising a rim member, a hub member, and series of spokes connecting said members, which consists in flexing the hub member axially to separate its connected series of spokes.

32. The method of tensioning a suspension vehicle wheel having a rim member with spoke engaging seats, a hub member with axially separated series of spoke engaging seats, spokes engaging the seats of the hub and rim members and connecting said members which consists in flexing the hub member to axially separate its series of spoke engaging seats.

33. The method of tensioning a suspension vehicle wheel comprising a rim member, a hub member, and series of spokes connecting said members and constituting therewith an assembled unit which consists in mounting the unit upon an inner hub member, and at the same time flexing the first-mentioned hub member axially to relatively move its connected series of spokes.

34. The method of forming a suspension vehicle wheel comprising a hub member, a rim member, and a series of spokes connecting said members, which consists in distorting the hub member within its elastic limit, securing the spokes to the hub and rim members while the hub member is under distortion, relieving the distortion of the hub member to tension the spokes, and thereafter relatively moving the hub and rim members to increase the tension of the spokes.

35. The method of forming a suspension vehicle wheel comprising a hub member, a rim member, and a series of spokes connecting said members, which consists in distorting the hub member within its elastic limit, securing the spokes to the hub and rim members while the hub is under distortion, relieving the distortion of the hub member to tension the spokes, and thereafter flexing the hub member to increase the tension of the spokes.

36. The method of forming a suspension vehicle wheel comprising a hub member, a rim member, and a series of spokes connecting said members, which consists in relatively moving the members to tension the spokes, and thereafter flexing the hub member to increase the tension of the spokes.

37. The method of forming a suspension vehicle wheel comprising a hub member, a rim member, and a series of spokes connecting said members, which consists in distortting the hub member within its elastic limit, securing the spokes to the hub and rim members while the hub member is under distortion, relieving the distortion of the hub member to tension the spokes, relatively moving the members to increase the tension of the spokes, and thereafter flexing the hub member to further increase the tension of the spokes.

38. The method of producing a suspension wire wheel which consists in providing a rim member and a second member within the rim member with seats to engage a plurality of spokes, and a plurality of spokes arranged with preformed shoulders at predetermined distances apart at opposite ends thereof, positioning the rim and second member in a predetermined position by the engagement of the spoke shoulders with the seats of the rim and second members, maintaining the predetermined position of the rim and second member by securing the ends of the spokes adjacent one of their shoulders to one of the members without modifying the predetermined distances between the shoulders, and thereafter tensioning the spokes by a relative movement of the seats of the rim and second members.

In testimony whereof I affix my signature.

WILLIAM N. BOOTH.